(12) United States Patent
Roberts et al.

(10) Patent No.: US 8,949,288 B1
(45) Date of Patent: Feb. 3, 2015

(54) METHODS, SYSTEMS, AND PRODUCTS FOR ACCESSING MEDIA

(75) Inventors: Thomas A. Roberts, Fuquay-Varina, NC (US); Christopher M. Amidon, Apex, NC (US)

(73) Assignee: Qurio Holdings, Inc., Raleigh, NC (US)

( * ) Notice: Subject to any disclaimer, the term of this patent is extended or adjusted under 35 U.S.C. 154(b) by 804 days.

(21) Appl. No.: 11/253,990

(22) Filed: Oct. 19, 2005

(51) Int. Cl.
*G06F 17/30* (2006.01)

(52) U.S. Cl.
USPC ........................................................ 707/805

(58) Field of Classification Search
USPC ............ 707/101, 999.101, 798, 805; 715/712
See application file for complete search history.

(56) References Cited

U.S. PATENT DOCUMENTS

| | | | |
|---|---|---|---|
| 5,499,330 A | | 3/1996 | Lucas |
| 5,621,874 A | | 4/1997 | Lucas |
| 5,786,820 A | | 7/1998 | Robertson |
| 5,835,094 A | | 11/1998 | Ermel |
| 6,025,839 A | | 2/2000 | Schell |
| 6,097,389 A | | 8/2000 | Morris |
| 6,144,962 A | * | 11/2000 | Weinberg et al. ...................... 1/1 |
| 6,188,405 B1 | | 2/2001 | Czerwinski |
| 6,301,586 B1 | * | 10/2001 | Yang et al. ............................. 1/1 |
| 6,466,237 B1 | | 10/2002 | Miyao |
| 2004/0128308 A1 | | 7/2004 | Obrador |
| 2005/0091596 A1 | * | 4/2005 | Anthony et al. .............. 715/712 |
| 2005/0134945 A1 | | 6/2005 | Gallagher |
| 2005/0160376 A1 | | 7/2005 | Sciammarella |
| 2005/0166158 A1 | * | 7/2005 | Blanchard et al. ............ 715/768 |
| 2005/0210403 A1 | * | 9/2005 | Satanek ........................ 715/786 |
| 2006/0107207 A1 | * | 5/2006 | Wada ............................. 715/526 |
| 2006/0161861 A1 | * | 7/2006 | Holecek et al. ............... 715/782 |

OTHER PUBLICATIONS

Woody Leonhard, Windows XP Timesaving Techniques for Dummies, Dec. 30, 2004, Wiley Publishing Inc, 2nd edition, pp. 335-336.*
The Konqueror Handbook, Pamela Roberts , Developers: The KDE Team, Revision 3.1 (Sep. 22, 2002), Chapters 1-3, http://docs.kde.org/stable/en/kdebase/konqueror/index.html.*

* cited by examiner

*Primary Examiner* — Alexey Shmatov
(74) *Attorney, Agent, or Firm* — Withrow & Terranova, PLLC

(57) ABSTRACT

Methods, systems, and products are disclosed for accessing media files. One such method accesses a hierarchically-arranged storage system storing media files. A graphical user interface is processed that has a single control. This single control allows a single input to select any media file within the hierarchical arrangement.

16 Claims, 16 Drawing Sheets

FIG. 1 (PRIOR ART)

+ My Pictures
- Vacations
+ Mountains
- Animals
    Frog.jpg
    Cow.jpg
    Horse.jpg

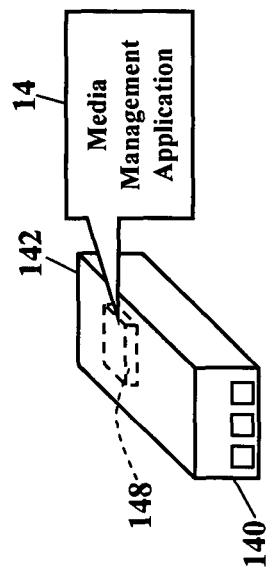
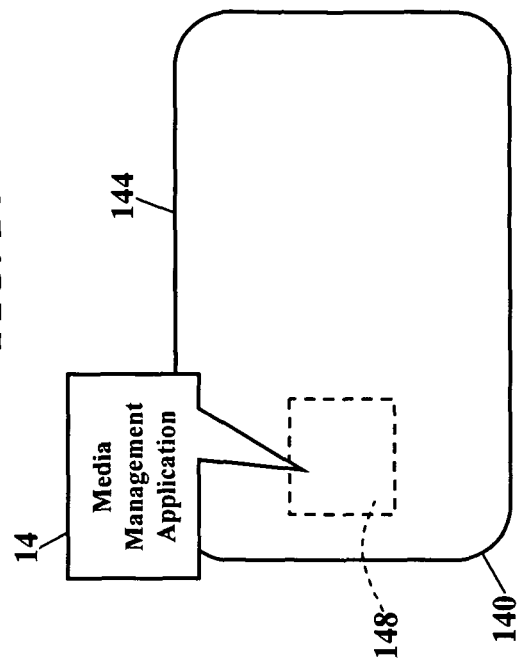
FIG. 13
FIG. 14

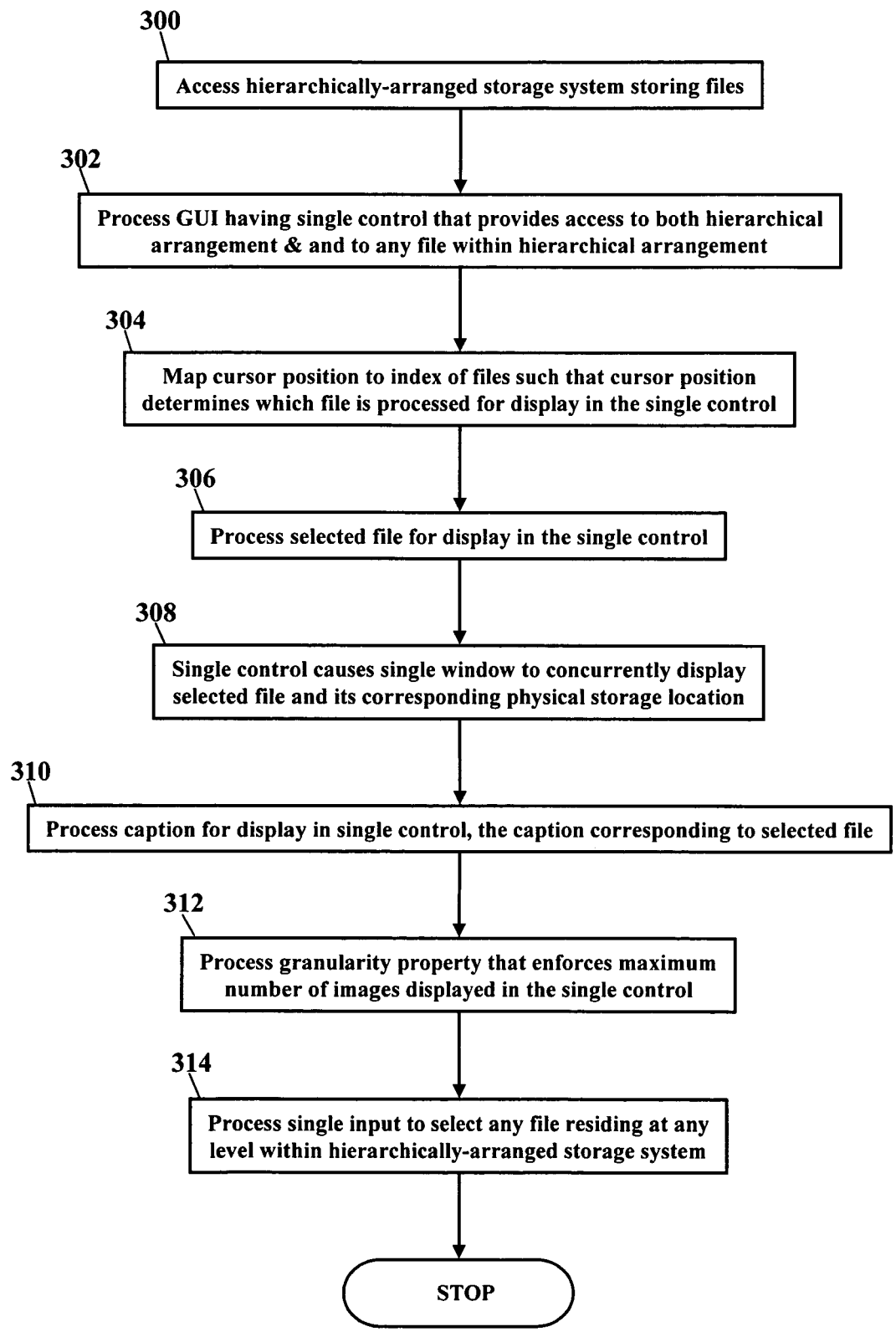

METHODS, SYSTEMS, AND PRODUCTS FOR ACCESSING MEDIA

BACKGROUND

This application particularly relates to graphical user interfaces and to 3-D icons.

User interfaces are used to access hierarchical storage systems. These hierarchical storage systems store files in a multi-level directory arrangement of folders. The existing user interfaces organize and display this hierarchical arrangement. FIG. 1, for example, illustrates a typical prior art "tree" control. This typical "tree" architecture depicts the hierarchical relationship between folders and sub-folders. Microsoft's WINDOWS® EXPLORER®, for example, utilizes these tree controls. A user "clicks" on the "+" or "–" to navigate within the hierarchical tree. As the user makes more and more input "clicks," the user delves farther into the tree control to access the contents of sub-folders. Other known user interfaces depict files as a one-dimensional scrolling strip. Still other known user interfaces display the files as a two-dimensional scrolling window.

These known user interfaces, however, are all cumbersome to use. The common tree control depicted by Microsoft's WINDOWS® EXPLORER® requires multiple inputs to navigate within the control. The user must navigate to the end of a tree branch to see the contents of a folder. If the desired file is not located within this branch, the user must begin anew in another branch. The scrolling one- and two-dimensional depictions, additionally, do not permit the creation and the viewing of sub-folders. If a desired file is not seen within the scrolling user interface, the user must choose another directory location. These known user interfaces, then, require multiple inputs before a desired file is located. These known user interfaces all require one control to display the hierarchical arrangement of stored files, and another control to view or otherwise access the contents of a file. What is needed, however, is a user interface that minimizes the number of inputs a user must make to navigate the hierarchically-arranged folders and to select a desired file.

SUMMARY

The aforementioned problems, and other problems, are reduced, according to exemplary embodiments, using methods, systems, and products that access files. The exemplary embodiments of the present invention allow a user to navigate a hierarchically-arranged system of files, and to select a file within the hierarchy, using a single input to a single control. This single control graphically presents the hierarchical or multi-level arrangement of stored files. The single control also processes and/or graphically presents the contents of any file within the hierarchy. When, for example, the hierarchical arrangement contains images (such as digital pictures), the exemplary embodiments allow the user to quickly scan the hierarchy and visually see all the images stored in the hierarchy. The exemplary embodiments of the present invention, additionally, present the hierarchical arrangement, and the images, in a single control. That is, the user need not access one control to see a typical hierarchical "tree" view and a file within that tree, and then open another, separate control to view an image. The exemplary embodiments, instead, allow a user to see both the hierarchy and the images in a single window of a single control. The exemplary embodiments, for example, allow a user to access any file, residing at any level within the hierarchy, by making a single "click" of a mouse or other input device. The user need not make multiple "clicks" in multiple windows to navigate through the hierarchically-arranged folders. The exemplary embodiments, then, provide an intuitive user interface with as few user interactions as possible.

The exemplary embodiments include methods, systems, and products for accessing files. One such method accesses a hierarchically-arranged storage system storing files. A graphical user interface is processed. The graphical user interface has a single control that provides access to both the hierarchical arrangement and to any file within the hierarchical arrangement.

The exemplary embodiments may be applied to any file having any file format. The exemplary embodiments, for example, may be utilized with data files, image files, or video files, regardless of formatting or file extension. The exemplary embodiments may also be utilized with any text file, word processing file, data management file, ASCII file, or any other file, regardless of software, format, or extension.

In another of the embodiments, a system provides access to stored files. A media management application is stored in memory, and a processor communicates with the memory. The processor accesses a hierarchically-arranged storage system storing files. The processor processes a graphical user interface having a single control. The single control permits access to the hierarchical arrangement of the files and to the files themselves.

In yet another embodiment, a computer program product provides access to files. The computer program product comprises a computer-readable medium storing processor-executable instructions. These instructions cause the processor to access a hierarchically-arranged storage system storing files. The instructions also cause the processor to process a graphical user interface having a single control. This single control permits user access to the hierarchical arrangement and to the files.

Other systems, methods, and/or computer program products according to the exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein:

FIG. 1 is a schematic illustrating prior art tree control for accessing files;

FIGS. 12-14 are schematics further illustrating various media devices for accessing files, according to the exemplary embodiments;

FIG. 17 is a flowchart illustrating a processor-implemented method of accessing stored files, according to an exemplary embodiment.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. These functions may be carried out through the operation of program logic, through dedicated logic, through the interaction of program control and dedicated logic, or even manually, the particular technique being selectable by the entity implementing the exemplary embodiments. Those of ordinary skill in the art further understand that the exemplary hardware, software, processes, methods, and/or operating systems described herein are for illustrative purposes and, thus, are not intended to be limited to any particular named manufacturer.

The exemplary embodiments describe a media management application that accesses files. This media management application graphically presents a hierarchical or multi-level arrangement of stored files. The media management application also process and/or graphically presents any image corresponding to a stored file. The exemplary embodiments of the present invention, then, present the hierarchical arrangement, and the images, in a single control. That is, the user need not access one control to see a typical hierarchical "tree" view and a file within that tree, and then open another, separate control to view an image. The media management application, instead, allows a user to see both the hierarchy and the contents of individual folders in a single window of a single control. The media management application allows a user to access any file, residing at any level within the hierarchy, by making a single "click" of a mouse or other input device. The user need not make multiple "clicks" in multiple windows to navigate through the hierarchically-arranged folders.

Figure 2:
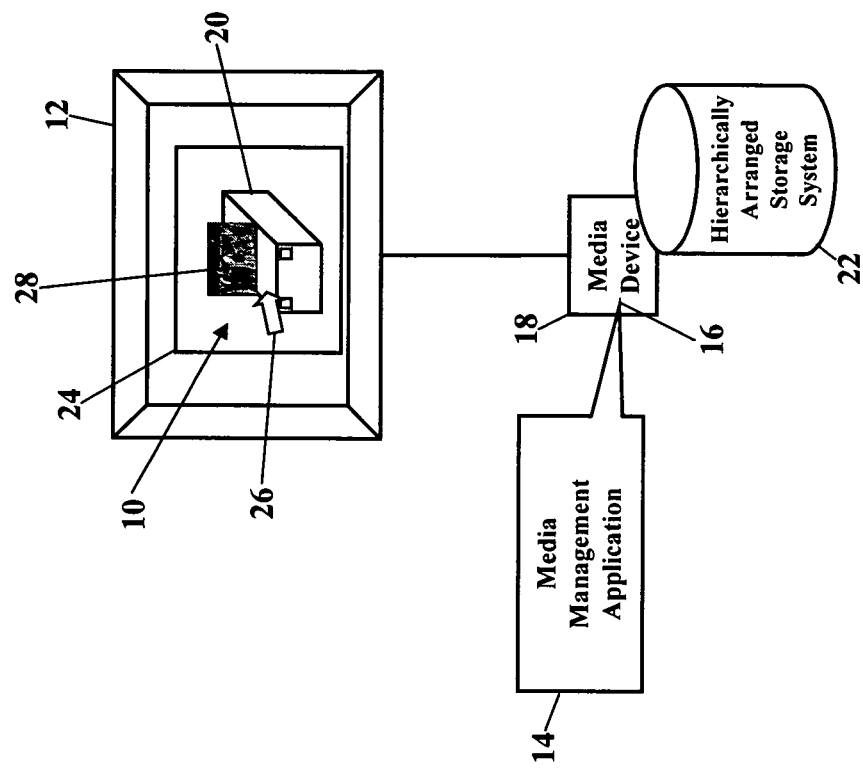
FIG. 2 is a simplified schematic illustrating a graphical user interface, according to exemplary embodiments.

FIG. 2 is a simplified schematic illustrating a graphical user interface 10, according to exemplary embodiments. The graphical user interface 10 is visually presented on a display device 12 by a media management application 14. The media management application 14 is a set of processor-executable instructions that are stored in memory 16 of a media device 18. Although the media device 18 is generically shown, the media device 18, as will be later explained, may be a computer, a personal digital assistant (PDA), a cordless/cellular/IP phone, or any other processor-controlled device. Whatever the media device 18, the graphical user interface 10 visually presents a single control 20. This single control 20 provides access to any file stored within a hierarchical arrangement of stored files. That is, when files are stored in a hierarchically-arranged storage system 22, the single control 20 provides access to both the hierarchical arrangement and to any file within the hierarchical arrangement. As FIG. 2 simply illustrates, the single control 20 causes a single window 24 to visually present both the hierarchical arrangement of the media files and all the media files. That is, the single control 20 may dragged and placed to any position within the single window 24. (The single control 20, in fact, may be dragged to, and placed within, any desktop window. The user may even "right click" on the single window 10 to add additional instances of the control.) A single input within the single window 24 allows a user to select any file residing at any level within the hierarchically-arranged storage system 22. The user, in other words, may place a cursor 26 within the single window 24 and, by simply moving the cursor 26 within the single control 20, visually scan all the files stored within the hierarchically-arranged storage system 22. As the following paragraphs will explain, the single control 20 correlates files to a position of the cursor 26. As the user moves the cursor 26, files are successively imaged according to the position of the cursor 26. The file corresponding to the position of the cursor 26 is visually presented as an image 28. The single control 20 thus allows the user to make a single input within the single window 24 to view and to select any file residing at any level within the hierarchically-arranged storage system 22. The user need not make multiple inputs (such as multiple clicks via a tactile mouse or key strokes) to navigate through the hierarchically-arranged storage system 22 to select the desired file.

The exemplary embodiments are customizable. As the following paragraphs will explain, the single control 20 may be configured to include any or all of the features described herein. The single control 20, for example, may be altered to suit a developer's technical and/or marketing needs. The single control 20, similarly, may be configured to suit a user's hardware/software capabilities, and the single control 20 may be configured as the user wishes. Those of ordinary skill in the art will also appreciate that there are many suitable implementations for the exemplary embodiments described herein. MICROSOFT®, for example, offers many software applications that could incorporate the exemplary embodiments (such as WINDOWS®, WORD®, OFFICE®, or PHOTO MANAGER®, all registered trademarks of Microsoft Corporation, One Microsoft Way, Redmond Wash. 98052-6399, 425.882.8080, www.Microsoft.com). PICASA® is software application that allows a user to find, edit, and share digital images helps you instantly find, edit and share all the pictures on your PC (PICASA® is a registered trademark of Google, Inc., 1600 Amphitheatre Parkway, Mountain View, Calif. 94043). Adobe's PHOTOSHOP® and ELEMENT® product allows a user to edit images, add text and special effects to images, and find and share those images (PHOTOSHOP® and ELEMENT® are registered trademarks of Adobe Systems Incorporated, 345 Park Avenue, San Jose, Calif. 95110). IPHOTO®, likewise, is a software product that permits organizing, editing, and sharing of digital media (IPHOTO® is a registered trademark of Apple Computer, Inc., 1 Infinite Loop, Cupertino, Calif. 95014). The exemplary embodiments, in fact, are applicable to any software application, regardless of the developer or vendor.

Figure 3:
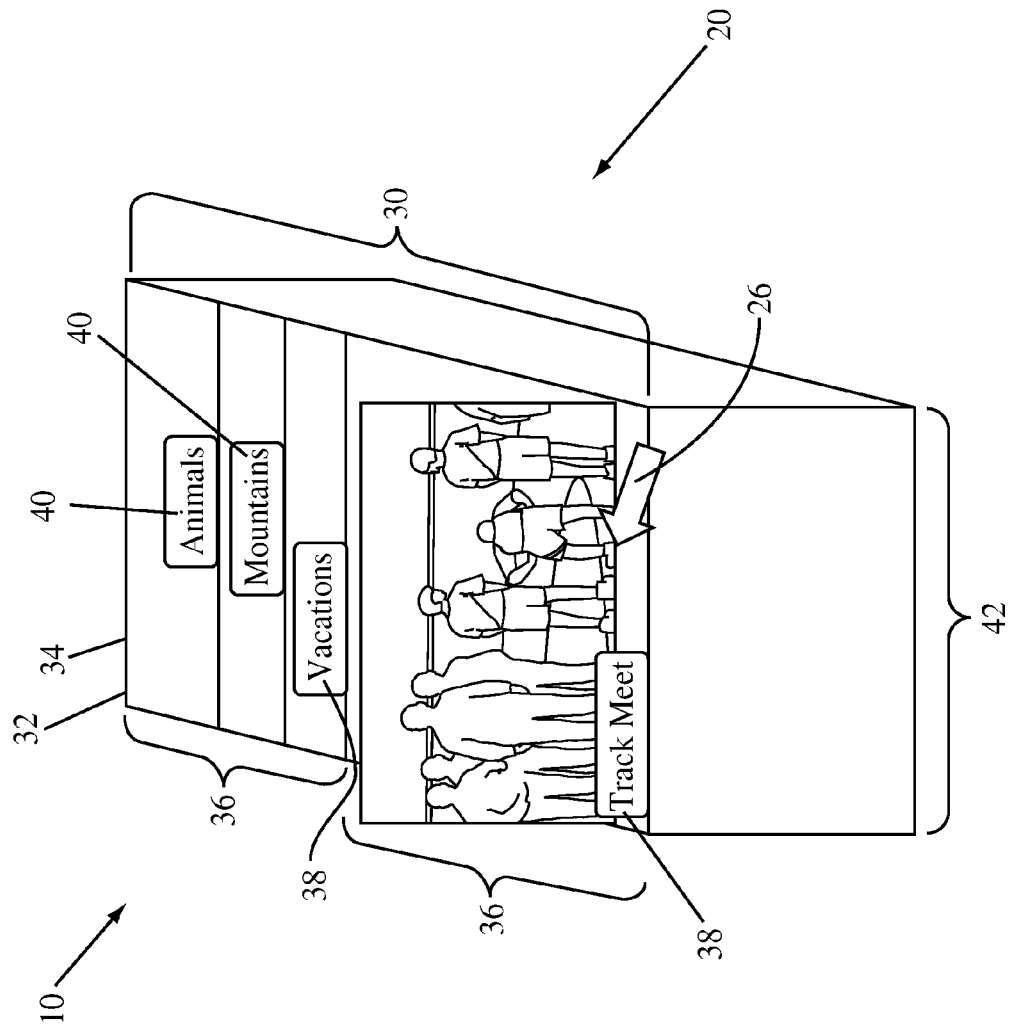
FIG. 3 is a more detailed schematic illustrating the graphical user interface, according to more exemplary embodiments.

FIG. 3 is a more detailed schematic illustrating the graphical user interface 10, according to more exemplary embodiments. Here the exemplary embodiments are tailored to access image and/or media files stored within the hierarchically-arranged storage system (shown as reference numeral 22 in FIG. 2). As FIG. 3 illustrates, the graphical user interface 10 provides access to a collection 30 of media files. The collection 30 of media files contains images (such as .jpg files or any other image files), and the collection 30 may contain other media files (such as video files and/or audio files). The graphical user interface 10 visualizes the collection 30 of media files as a container 32. The container 32 has the shape of a shoebox 34, although the container 32 may be graphically represented as any one-, two-, or three-dimensional geometric shape (such as a file drawer or picture album). The collection 30 of media files may or may not be arranged according to common themes, categories, or subjects. FIG. 3, for example, illustrates the user's collection 30 of media files as a hierarchical arrangement of albums. Each album 36 is graphically represented with a tab 38. One or more indented tabs 40 may represent sub-albums within each album 36. The single control 20 thus accommodates multiple hierarchical album or folder levels by graphically indenting the tabs across a width 42 of the single control 20. The single control 20, in other words, permits the user to create albums within albums. As the number of sub-albums grows, the indented tabs 40 may be reduced in size to accommodate increasing numbers of levels. Each tab 38 or 40 graphically shows a folder/album name or an abbreviated version of such name.

As the user moves the cursor 26, media files are displayed. The user may move the cursor 26 using any input via a keyboard, mouse, or other tactile or sensory device. As the user moves the cursor 26 across the single control 20, the cursor's position determines what media file is prominently or conspicuously displayed. That is, as the cursor 26 scrolls over the hierarchical arrangement of folders (graphically represented by the tabs and the indented sub-tabs 40), the image beneath the cursor 26 is displayed. If the user hovers or lingers the cursor 26 at a position in the single control 20, any media file associated with that position is processed for display. If the user moves or drags the cursor 26 across the single control 20, media files corresponding to the cursor's instantaneous position are imaged.

Figure 4:
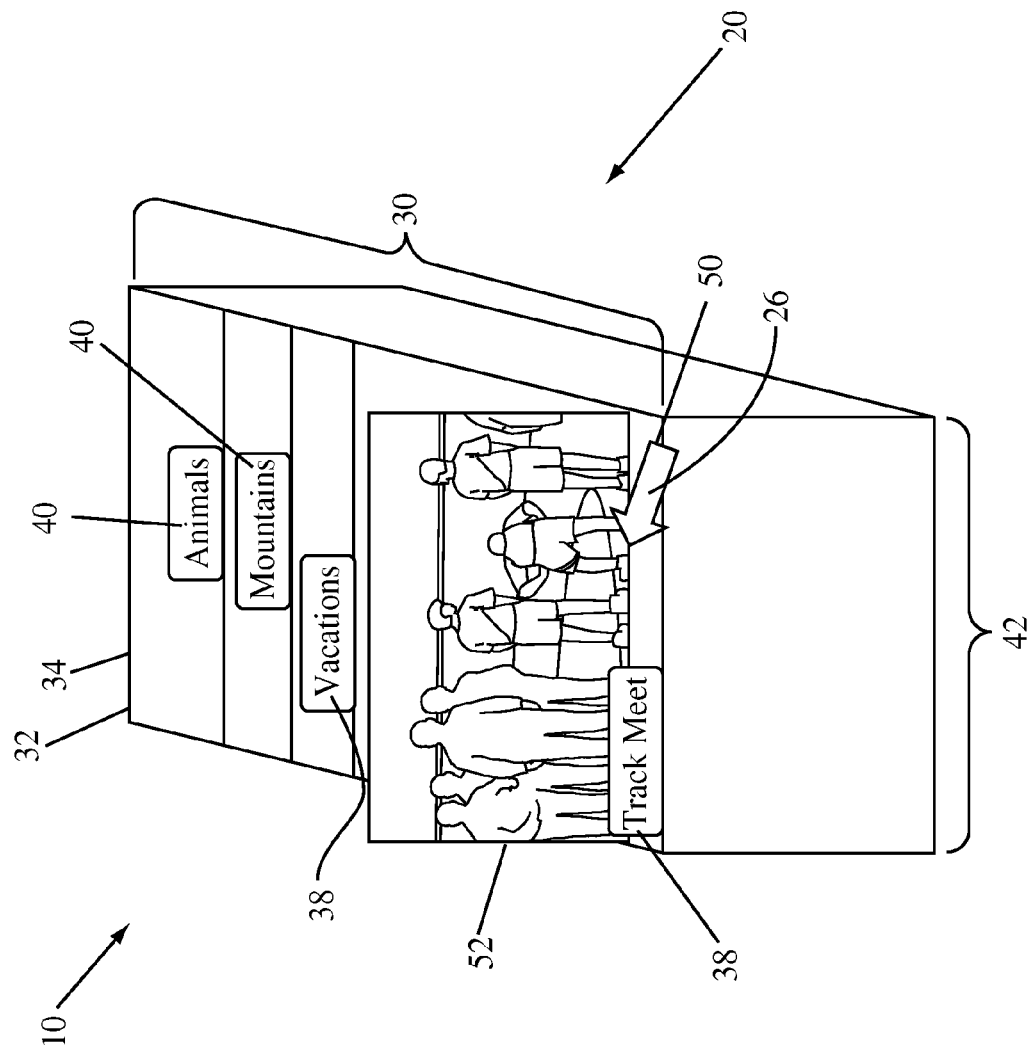
FIGS. 4 and 5 are schematics illustrating the display of an image, according to yet more exemplary embodiments.
Figure 5:
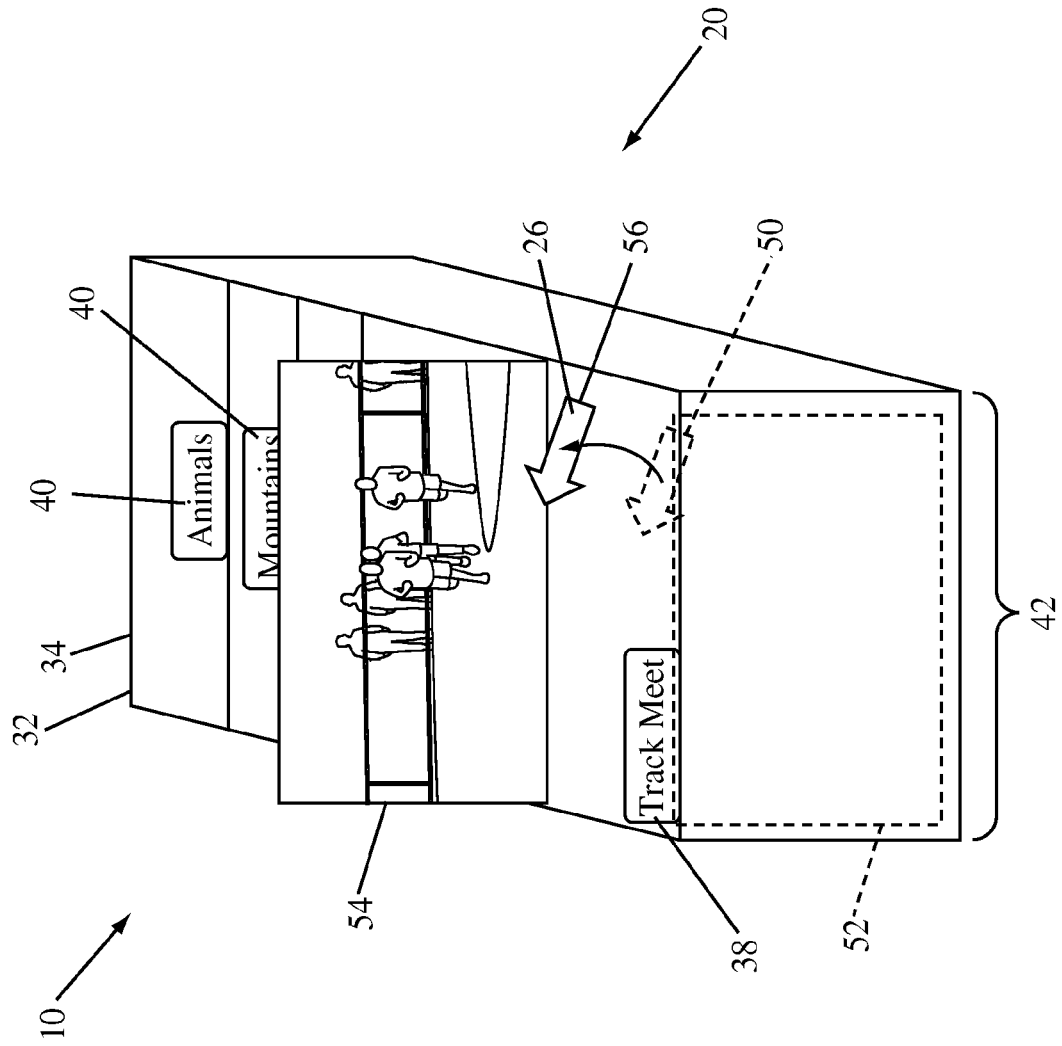

FIGS. 4 and 5 are schematics illustrating the display of an image, according to yet more exemplary embodiments of the present invention. An image corresponding to a media file is successively displayed according to the position of the cursor 26. Here, however, the single control 20 prominently or conspicuously displays each image by a rising-and-falling motion. As FIG. 4 illustrates, the user places or moves the cursor 26 to a first position (graphically denoted with reference numeral 50). The single control 20 then uses the cursor's coordinates to determine which media file is imaged. The cursor's position is mapped to an index of the media files, such that the cursor position determines which media file is processed for display in the single control. Once the single control 20 determines which media file corresponds to the cursor's position, the single control 20 then processes that media file for display. FIG. 4 illustrates an image 52 corresponding to the first position 50 of the cursor 26. This currently-viewed image 52 graphically rises up to a position above any other images in the user's collection 30 of media files. Here, only the currently-viewed image 52 rises. All other images in the user's collection 30 of media files are static—that is, the other images in the collection 30 do not move and statically remain below the currently-viewed image 52. This rising motion prominently or conspicuously displays the image 52 corresponding to the current position of the cursor 26.

FIG. 5, however, illustrates selection and display of another image 54. If the user places or moves the cursor 26 to a second position (graphically denoted with reference numeral 56), the single control 20 again uses the cursor's new coordinates to determine which new media file is selected for imaging. The cursor's second position 56 is again mapped to the index of the media files to determine what new media file is processed for display. The single control 20 then de-emphasizes the previously-selected image 52. FIG. 5 illustrates this de-emphasizing by a lowering or sinking motion, although any other technique may be used. The new, currently-viewed image 54 (corresponding to the cursor's second position 56) graphically rises, while the previously-selected image 52 falls. This rising-and-falling effect may be variously timed to create realistic illusions. The user may also configure the single control 20 and select the timing parameters for this rising-and-falling motion, such the illusory effect suits the user's visual and mental capabilities.

The single control 20 thus provides access to both the hierarchical arrangement and to any file within the hierarchical arrangement. Movement of the cursor 26 allows the user to quickly and easily scan the entire contents of the hierarchically-arranged storage system (such as that shown as reference numeral 22 in FIG. 2). A single input (such as mouse "click" or keyboard depression) then allows the user to select any file residing at any level within the hierarchy. All the user needs to do is move the cursor 26 to visually scan all the files stored within the hierarchically-arranged storage system. The single control 20 thus allows the user to make a single input to the single control 20 to view and to select any file, regardless of that file's physical storage location within the hierarchy. The single control 20 thus integrates hierarchical relationship and display of images into a single, flexible, and intuitive control. The single control 20 relieves the user from making multiple inputs (or "clicks" of a tactile mouse) when selecting files.

The single control 20 may display an image of any size. The single control 20, for example, may scale images to suit the size, width, or length of the single control 20. The single control 20 may be scaled to present full-sized 3×5, 4×6, or even larger images. Those of ordinary skill in the art understand, however, that the processing of larger images impacts responsiveness. A folder containing larger 1600×1280 pixel resolution images, for example, may slow the responsiveness of the single control 20. The single control 20, however, more quickly processes thumbnail-sized images. As those of ordinary skill in the art also understand, the use of thumbnails allows quick panning of media files and other files. Although the single control 20 operates with any sized image, the single control 20 is more responsive to thumbnails. If the single control 20 accesses larger images, the single control 20 may be configured to partition cache memory to create thumbnails for the media files. A single click on a thumbnail would then open its larger image.

The single control 20, as earlier mentioned, correlates files to the position of the cursor 26. As the user moves the cursor 26, files are successively imaged according to the position of the cursor 26. The image processed for display may be determined by interpolating the cursor's y-position into an index. The index is based on the number of files in an album and on the y-distance between two tabs that delimit the album and the location of the tabs. A limitation may exist in that the vertical distance between the tabs in pixels must be greater than or equal to the number of images in an album. If an album, for example, has twenty (20) media files, a distance between one album tab and a successive tab (or the end of the single control 20) must be ≥20 pixels. The image index may be obtained by the following formula:

$$\text{Index} = P - \left[\frac{(Y - N_y)}{A_y - N_y}\right] \quad \text{(Equation \#1)}$$

where

Y is the y-coordinate of the cursor in relation to a polygonal shape representing an open area of the shoebox, $A_y$ is a y-coordinate of an album tab Y coordinate, $N_y$ is a y-coordinate of an adjacent or successive tab, and P is the number of media files in an album.

Should the resultant Index value be zero (0), then the Index value is incremented to a value of one (1).

The single control 20 may use an alternative methodology. Here the single control 20 images a file using position along a line. The single control 20 mathematically represents the user's albums as a diagonal line. This diagonal line is established between two points allocated to the single control 20. The diagonal line, for example, is established from a lower left corner of the area allocated to the single control 20 to an upper right corner of that same area. This diagonal line allows more media files to be displayed in a smaller area because a length of this line is greater. Any file's position along the diagonal line is computed by finding an intersection between the diagonal line and a perpendicular line running through the current cursor coordinate. This intersecting point is interpolated into the index using the number of files within an album and the length of the diagonal line (as earlier stated). The position on the diagonal line can be computed as follows:

$$PosX = \frac{b - b_2}{m_2 - m} \quad \text{(Equation \#2)}$$

$$PosY = m*PosX + b \quad \text{(Equation \#3)}$$

where $b_2$ is a y-offset of the perpendicular line, $m_2$ is a slope of the perpendicular line, b is a y-offset of the diagonal line, and m is a slope of the diagonal line.

The index may then be obtained using the known distance formula. The length of the diagonal line may be computed from $$LengthDiag = \sqrt{(Y_2 - Y_1)^2 + (X_2 - X_1)^2}. \quad \text{(Equation \#4)}$$

A length of a line segment from the lower left point of the diagonal line to the intersection point computed above may again be computed from the known distance formula:

$$LengthSegment = \sqrt{(PosY - Y_1)^2 + (PosX - X_1)^2}.$$

The index is then interpolated using the number of files in an album:

$$\text{Index} = \frac{LengthSegment}{LengthDiag} * imageCount. \quad \text{(Equation \#5)}$$

As this patent earlier explained, should the resultant Index value be zero (0), then the Index value is incremented to a value of one (1).

Figure 6:
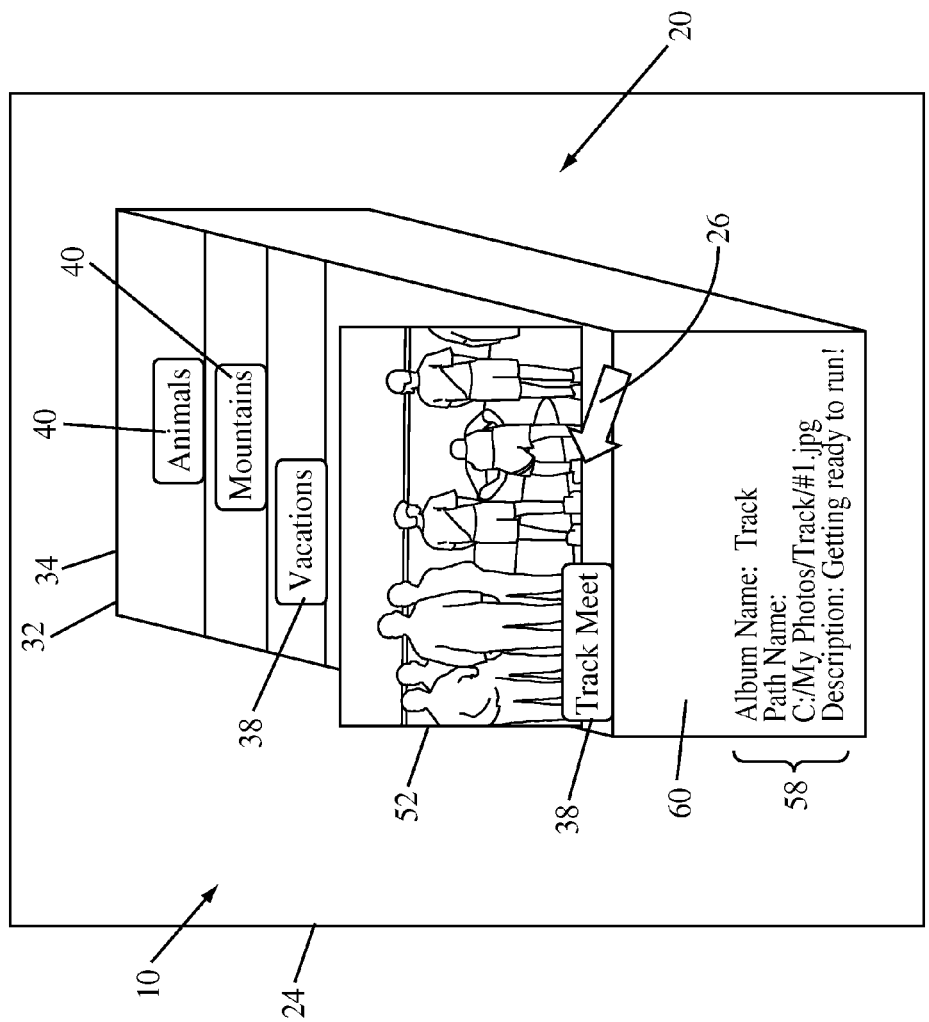
FIG. 6 is a schematic illustrating an image caption area, according to still more exemplary embodiments.

FIG. 6 is a schematic illustrating an image caption area 58, according to still more exemplary embodiments of the present invention. This image caption area 58 visually and/or audibly presents an explanation or description of the currently-viewed image. The single control 20 thus causes the single widow 24 to concurrently display the currently-selected media file and its corresponding caption. As the image 52 graphically rises to a prominent position, any textual or audible explanation or description of the currently-viewed image is presented. The image caption area 58, for example, may visually or audibly present a path name or multi-level storage location for the image 52. The image caption area 58 may additionally or alternatively visually or audibly present the user's description or explanation of the image 52. The single control 20 may even permit searching of text within the image caption area 58, thus allowing the user to quickly locate media files matching a query string.

The image caption area 58 may be positioned at any location within the single window 24. FIG. 6 visualizes the image caption area 58 as a front side 60 of the shoebox 34. The image caption area 56 thus effectively utilizes the desktop space allocated to the single control 20. That is, the image caption area 58 not only visually presents a caption associated with the image 52, but the image caption area 58 also conserves desktop space by graphically forming a portion of the container 32. The user, however, may configure the image caption area 58 to suit their needs, such that the image caption area 58 may be located in any portion or region within the single control 20.

The tabs may be sensitive to cursor position. The tabs 38 and 40 may be graphically altered as the cursor 26 moves over, or in the vicinity of, a tab. As the user moves the cursor 26 over a tab, the single control 20 may display a full album name and/or a physical path of the album's location. As the cursor 26 approaches or moves over a tab, the single control 20 may alter the appearance of a tab, such as changing its color, shading, or shape. The single control 20 may additionally or alternatively highlight or otherwise emphasize the tab graphic when the cursor 26 moves within an area associated with that tab. When, for example, the user moves the cursor 26 over files associated with the indented tab 40, the single control 20 would graphically alter the indented tab 40. The single control 20 may also graphically alter the upper level main tab 38.

Figure 7:
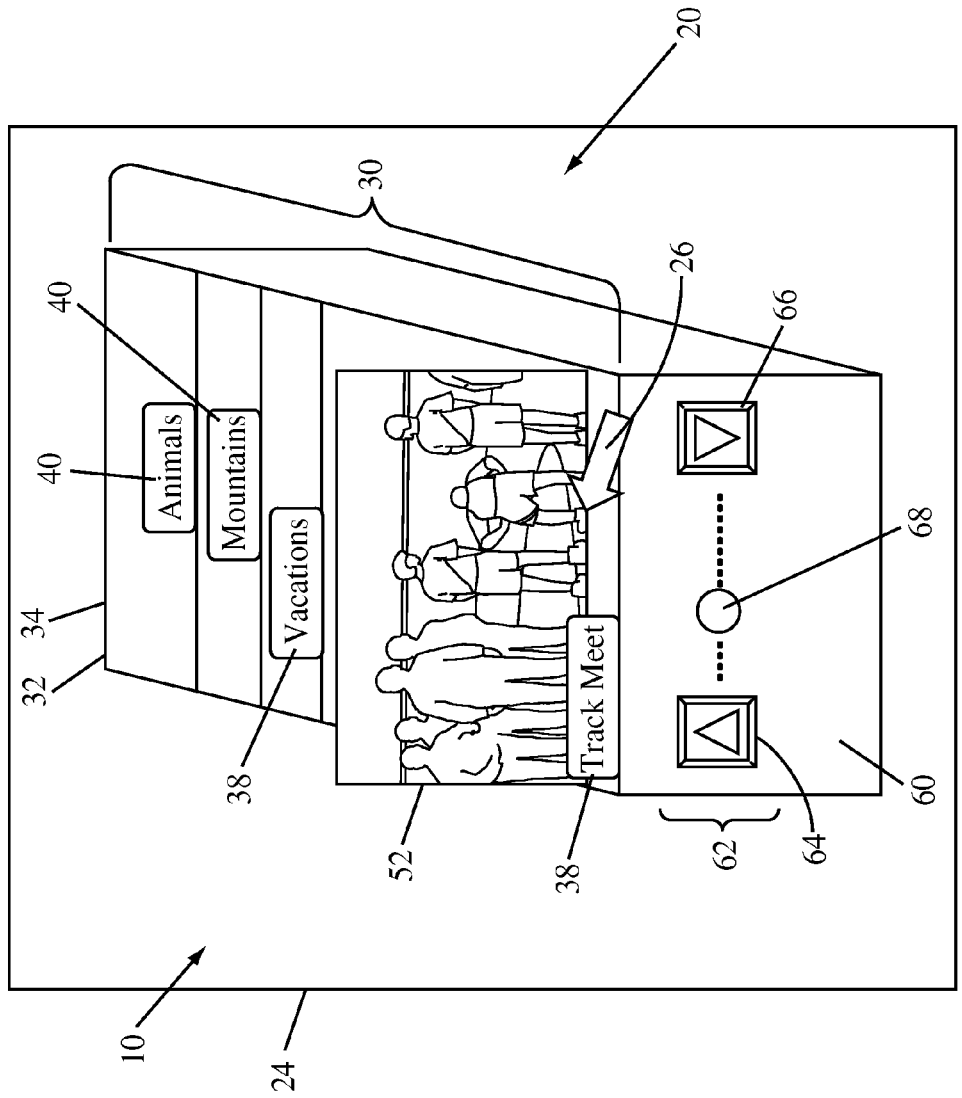
FIG. 7 is a schematic illustrating a scalability feature, according to exemplary embodiments.

FIG. 7 is a schematic illustrating a scalability feature, according to exemplary embodiments of the present invention. This scalability feature enforces a maximum number of media images that may be displayed in the single control 20. As the user's collection 30 of files grows, the spaces between album tabs 40 may become small. As the space between albums decreases, the user may have difficulty navigating the single control 20. When, for example, the user organizes more and more media files into albums and sub-albums, the tabs 38 and/or the indented tabs 40 may become dense and closely spaced. The user may then have trouble placing the cursor 26 above a desired media file.

The single control 20, however, may include a granularity property 62. As the number of albums and media files grows, the space between tabs may become too small to easily navigate. The granularity property 62 enforces a maximum number of imaged media files per graphical unit, be it a millimeter, ten pixels, one inch, or whatever measure is preferred. When the required space to display the hierarchical arrangement becomes greater than the area allocated to the single control 20, even taking into account the granularity property 62, the single control 20 will visually scroll the user's collection 30 of media files. When, for example, the user's collection 30 of media files is visually depicted using the shoebox 34, the contents of the shoebox 34 will visually scroll forwards and backwards. This scrolling action is accomplished using scroll button controls 64 and 66. While these scroll button controls 64 and 66 may be graphically placed at any location within the single control 20, FIG. 7 illustrates the scroll button controls 64 and 66 oriented on the front side 60 of the shoebox 34. When either of these scroll button controls 64 and 66 is graphically "pressed" (e.g., by placing the cursor 26 on either control and depressing a mouse button), the contents of the shoebox 34 visually scroll in the desired direction. An auto-scrolling feature may also be activated by hovering or moving the cursor 26 at or near a beginning portion or end portion of the single control 20. A graphical slider control 68 may also be graphically included that allows the user to increase or decrease granularity. As the user moves the slider control 68, the granularity property 62 changes.

An example helps explain granularity. Suppose an album contains 400 media files. Suppose also that an area between tabs (38 and/or 40) is only 200 pixels in length. In this example, then, there are more pictures than pixels, so the position of the cursor 26 could not be associated to an individual media file. That is, each movement between adjacent pixels would move two media files (e.g., move two images). Here, then, there is not enough granularity in this space to show all the media files. The granularity property 62, however, "stretches" the tabs farther apart to increase the pixel length between tabs. Because the tabs are stretched apart, not all the tabs may visually fit within the single control 20. The scroll button controls 64 and 66, then, allow the user to scroll front-to-back (or back-to-front) to view all the contents of the shoebox 34.

The single control 20 may include other features. The single control 20, for example, may be stretchable. All the features of the single control 20 may (or may not) be proportionally sized. If the user increases the size of the single window 24, then the single control 20 (and any features discussed above) increase in size. If the single window 24 is decreased in size, the single control 20 decreases. The single control 20 may also accommodate landscape or portrait orientation when imaging a media file.

Figure 8:
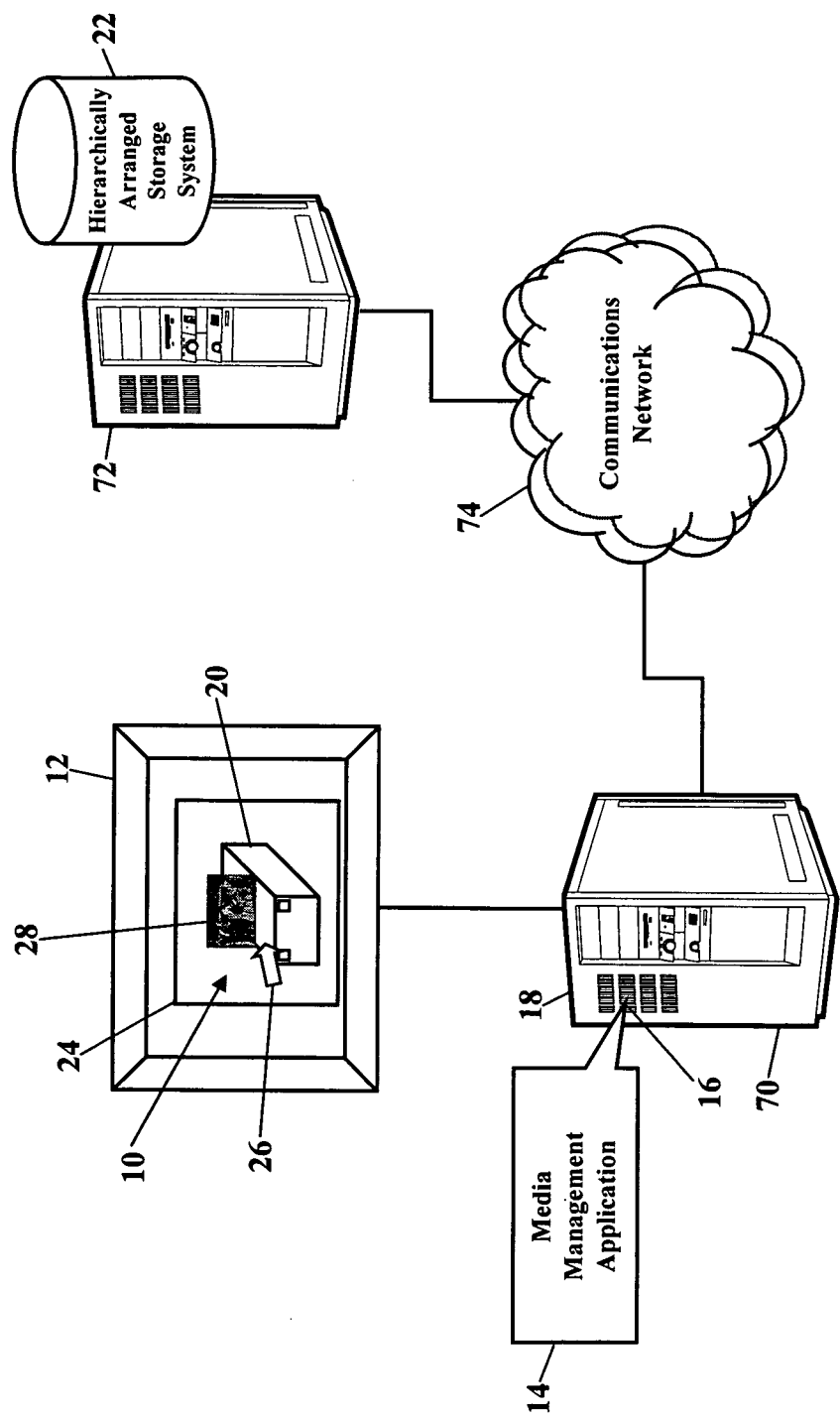
FIG. 8 is a schematic illustrating another operating environment, according to exemplary embodiments.

FIG. 8 is a schematic illustrating another operating environment, according to exemplary embodiments. Here the media management application 14 operates in a networked environment. The media management application 14 is again stored in the memory 16 of the media device 18. Although the media device 18 may be any device and have any construction, FIG. 8 illustrates the media device 18 as a computer 70. The media management application 14 causes the graphical user interface 10 to be visually presented on the display device 12 as the single control 20. This single control 20 provides access to any file stored within the hierarchically-arranged storage system 22. Here, however, the hierarchically-arranged storage system 22 may be partially or entirely maintained on a remote server 72. The remote server 72 communicates with the media management application 14 and the computer 70 via a communications network 74. The media management application 14 may access any file stored in memory of the remote server 72. So, should the user remotely maintain any files at any location accessible via the communications network 74, those remotely-stored files may be accessed as explained herein. Moreover, the exemplary embodiments may be applied regardless of networking environment. The communications network 74 may be a cable network operating in the radio-frequency domain and/or the Internet Protocol (IP) domain. The communications network 74, however, may also include a distributed computing network, such as the Internet (sometimes alternatively known as the "World Wide Web"), an intranet, a local-area network (LAN), and/or a wide-area network (WAN). The communications network 74 may include coaxial cables, copper wires, fiber optic lines, and/or hybrid-coaxial lines. The communications network 74 may even include wireless portions utilizing any portion of the electromagnetic spectrum and any signaling standard (such as the I.E.E.E. 802 family of standards, GSM/CDMA/TDMA or any cellular standard, and/or the ISM band). The concepts described herein may be applied to any wireless/wireline communications network, regardless of physical componentry, physical configuration, or communications standard(s).

Figure 9:
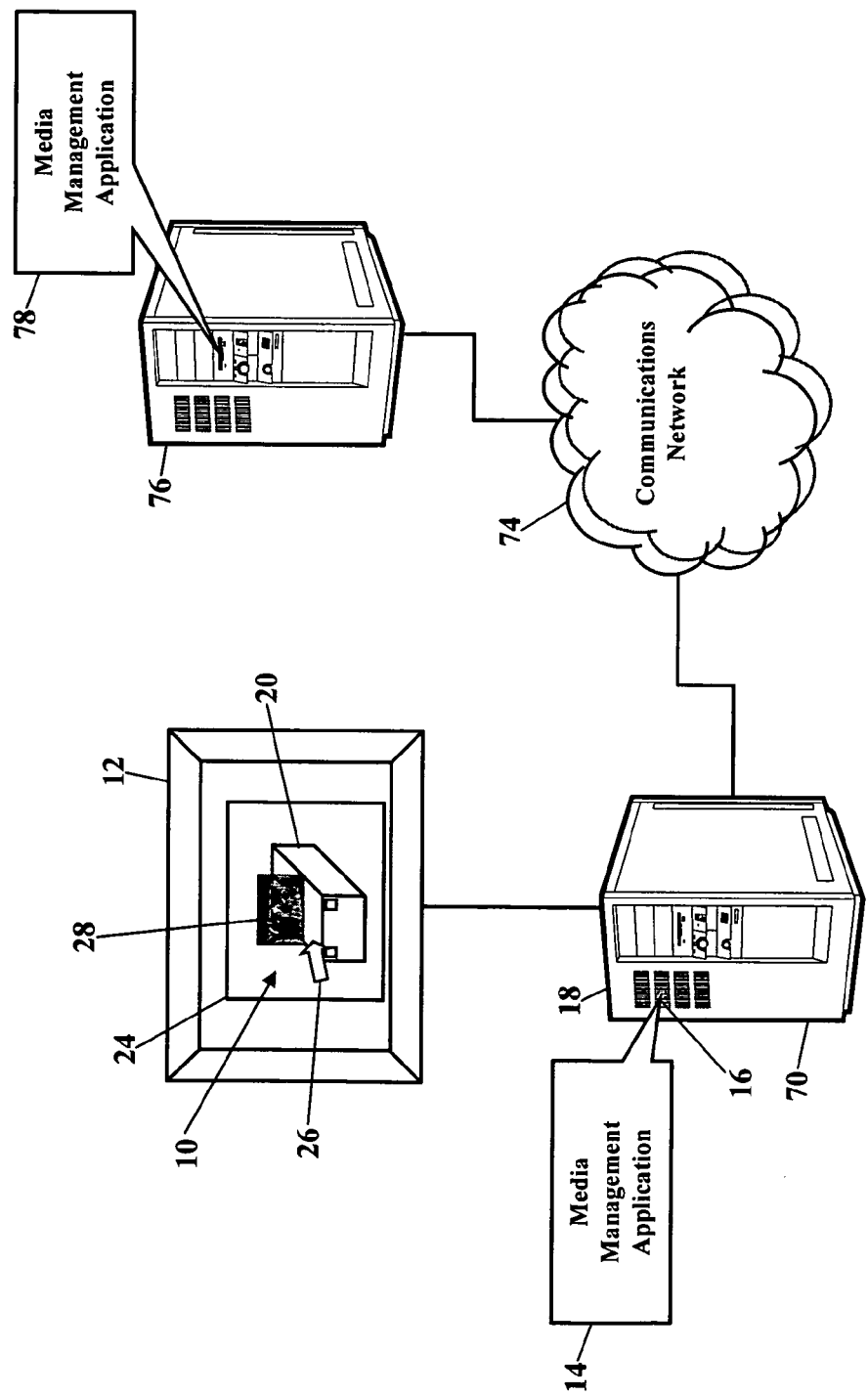
FIG. 9 is a schematic illustrating yet another operating environment, according to exemplary embodiments.

FIG. 9 is a schematic illustrating yet another operating environment, according to exemplary embodiments. Here some portions of the media management application 14 remotely operate at a network server 76. That is, some portions of the media management application 14 may store in the memory 16 of the media device 18 (e.g., the computer 70), while other complimentary portions 78 store in the network server 76. The computer 70 and the network server 76 communicate via the communications network 74 and have a client-server relationship.

Figure 10:
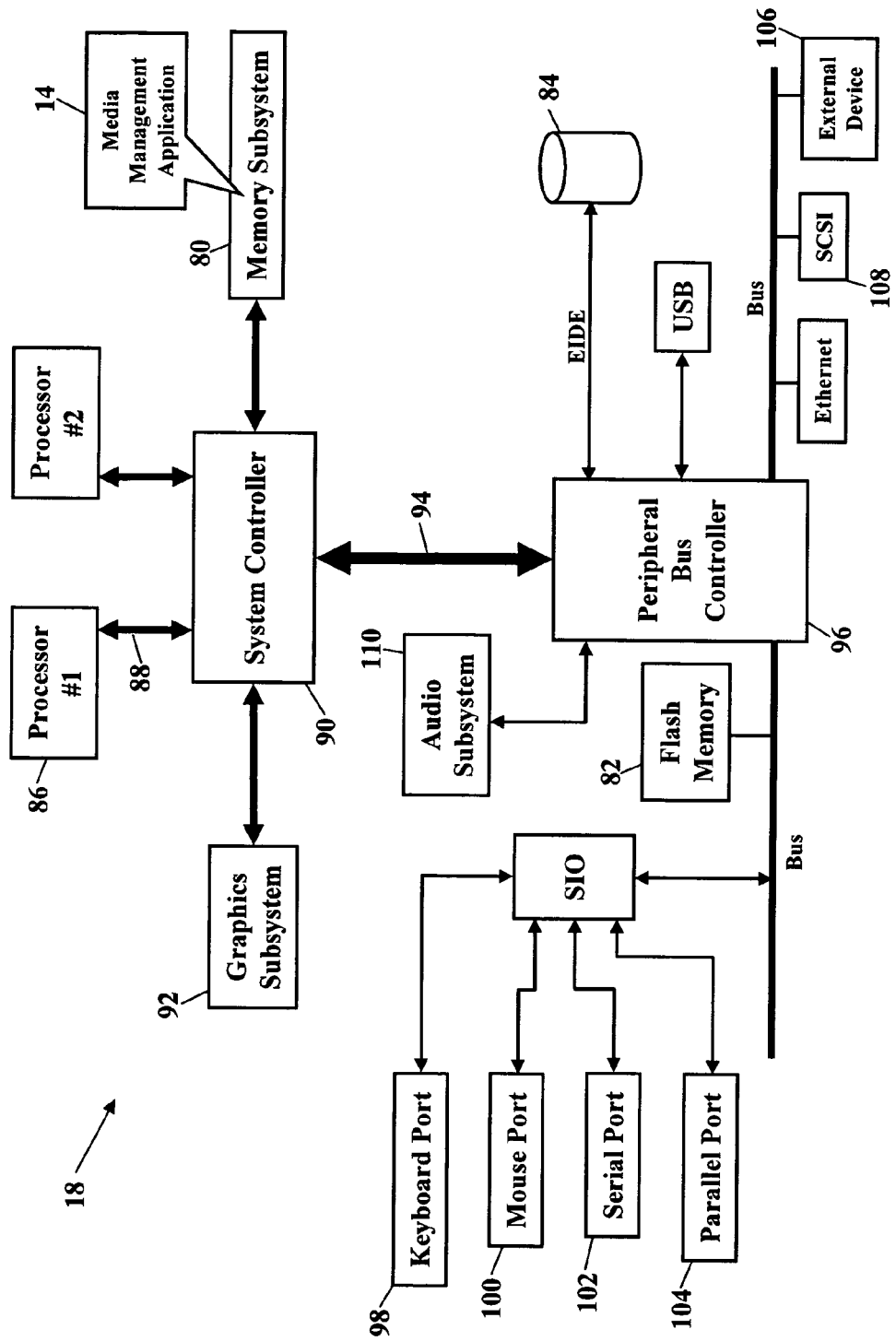
FIG. 10 depicts another possible operating environment for the exemplary embodiments.

FIG. 10 depicts another possible operating environment for the exemplary embodiments. FIG. 10 is a block diagram showing the media management application 14 residing in the media device 18 (such as the computer 70 shown in FIGS. 8 and 9). FIG. 10, however, may also represent a block diagram of any computer, media device, or processor-controlled device. The media management application 14 operates within a system memory device. The media management application 14, for example, is shown residing in a memory subsystem 80. The media management application 14, however, could also reside in flash memory 82 or peripheral storage device 84. The media device 18 also has one or more central processors 86 executing an operating system. The operating system, as is well known, has a set of instructions that control the internal functions of the media device 18. A system bus 88 communicates signals, such as data signals, control signals, and address signals, between the central processor 86 and a system controller 90. The system controller 90 provides a bridging function between the one or more central processors 86, a graphics subsystem 92, the memory subsystem 80, and a PCI (Peripheral Controller Interface) bus 94. The PCI bus 94 is controlled by a Peripheral Bus Controller 96. The Peripheral Bus Controller 96 is an integrated circuit that serves as an input/output hub for various peripheral ports. These peripheral ports could include, for example, a keyboard port 98, a mouse port 100, a serial port 102, and/or a parallel port 104 for a video display unit, one or more external device ports 106, and external hard drive ports 108 (such as IDE, ATA, SATA, or SCSI). The Peripheral Bus Controller 96 could also include an audio subsystem 110. Those of ordinary skill in the art understand that the program, processes, methods, and systems described herein are not limited to any particular system or hardware.

One example of the central processor 86 is a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), and Transmeta Corp. (3940 Freedom Circle, Santa Clara, Calif. 95054, www.transmeta.com). Those skilled in the art further understand that the program, processes, methods, and systems described herein are not limited to any particular manufacturer's central processor.

According to an exemplary embodiment, any of the WINDOWS® (WINDOWS® is a registered trademark of Microsoft Corporation, One Microsoft Way, Redmond Wash. 98052-6399, 425.882.8080, www.Microsoft.com) operating systems may be used. Other operating systems, however, are also suitable. Such other operating systems would include the UNIX® operating system (UNIX® is a registered trademark of the Open Source Group, www.opensource.org), the UNIX-based Linux operating system, WINDOWS NT®, and Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described herein are not limited to any particular operating system.

The system memory device (shown as memory subsystem 80, flash memory 82, or peripheral storage device 84) may also contain an application program. The application program cooperates with the operating system and with a video display unit (via the serial port 102 and/or the parallel port 104) to provide a Graphical User Interface (GUI). The Graphical User Interface typically includes a combination of signals communicated along the keyboard port 98 and the mouse port 100. The Graphical User Interface provides a convenient visual and/or audible interface with a user of the media device 18.

Figure 11:
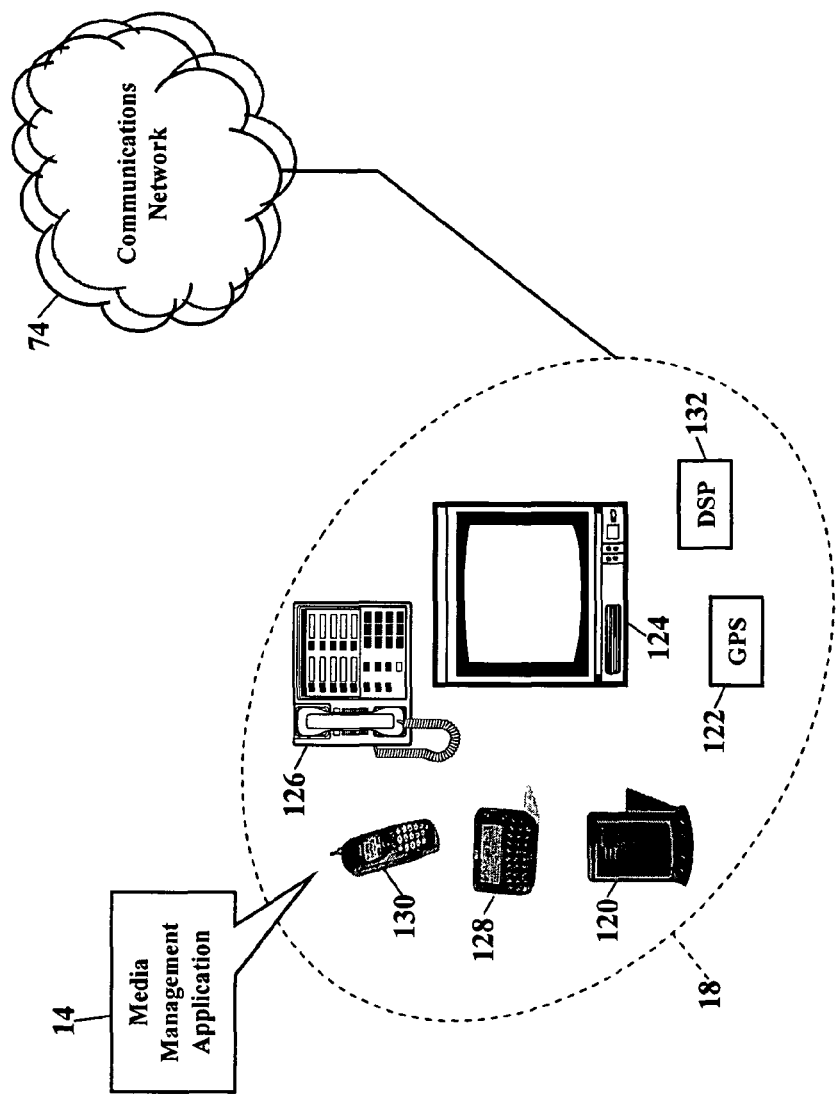
FIG. 11 is a schematic illustrating additional operating environments for the exemplary embodiments.

FIG. 11 is a schematic illustrating still more exemplary operating environments. FIG. 11 illustrates that the media management application 14 may alternatively or additionally operate within various other media devices 18. FIG. 11, for example, illustrates that the media management application 14 may entirely or partially operate within a personal digital assistant (PDA) 120, a Global Positioning System (GPS) device 122, an interactive television 124, an Internet Protocol (IP) phone 126, a pager 128, a cellular/satellite phone 130, or any system and/or communications device utilizing a digital signal processor (DSP) 132. The communications device 16 may also include watches, radios, vehicle electronics, clocks, printers, gateways, and other apparatuses and systems.

Figure 12:
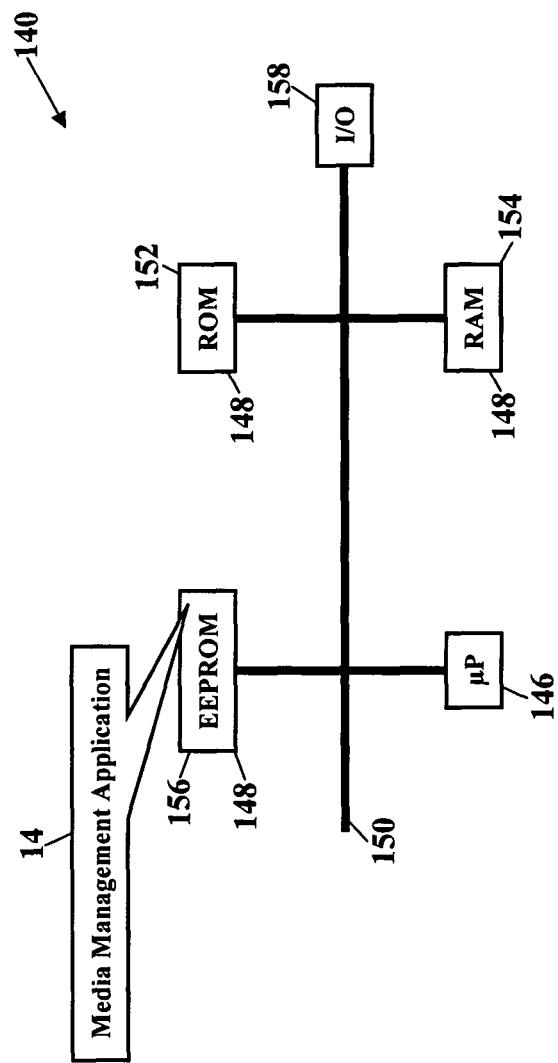

FIGS. 12-14 are schematics further illustrating various media devices for accessing files, according to the exemplary embodiments. FIG. 12 is a block diagram of a Subscriber Identity Module 140, while FIGS. 13 and 14 illustrate, respectively, the Subscriber Identity Module 140 embodied in a plug 142 and the Subscriber Identity Module 140 embodied in a card 144. As those of ordinary skill in the art recognize, the Subscriber Identity Module 140 may be used in conjunction with many media and communications devices (such as the media devices 14 shown in FIG. 11). The Subscriber Identity Module 140 stores user information (such as the user's International Mobile Subscriber Identity, the user's $K_i$ number, and other user information) and any portion of the media management application 14. As those of ordinary skill in the art also recognize, the plug 142 and the card 144 each interface with the media device 18 according to GSM Standards 2.17 and 11.11 and ISO Standard 7816, with each incorporated herein by reference. The GSM Standard 2.17 is formally known as "European digital cellular telecommunications system (Phase 1); *Subscriber Identity Modules, Functional Characteristics* (GSM 02.17 V3.2.0 (1995-01))." The GSM Standard 11.11 is formally known as "Digital cellular telecommunications system (Phase 2+) (GSM); *Specification of the Subscriber Identity Module—Mobile Equipment (Subscriber Identity Module—ME) interface* (GSM 11.11 V5.3.0 (1996-07))." Both GSM standards are available from the European Telecommunication Standards Institute (650 route des Lucioles, 06921 Sophia-Antipolis Cedex, FRANCE, Tel.: +33 (0)4 92 94 42 00, Fax: +33 (0)4 93 65 47 16, www.etsi.org). The ISO Standard 7816 is formally known as "*Information technology—Identification cards—Integrated circuit(s) cards with contacts,*" and the standard is available from the International Organization for Standardization (*ISO*) (1, rue de Varembé, Case, postale 56CH-1211 Geneva 20, Switzerland, Telephone +41 22 749 01 11, Telefax +41 22 733 34 30, www.iso.org).

FIG. 12 is a block diagram of the Subscriber Identity Module 140, whether embodied as the plug 142 of FIG. 13 or as the card 144 of FIG. 14. Here the Subscriber Identity Module 140 comprises a microprocessor 146 (μP) communicating with memory modules 148 via a data bus 150. The memory modules may include Read Only Memory (ROM) 152, Random Access Memory (RAM) and or flash memory 154, and Electrically Erasable-Programmable Read Only Memory (EEPROM) 156. The Subscriber Identity Module 140 stores some or all of the media management application 14 in one or more of the memory modules 148. FIG. 12 shows the media management application 14 residing in the Erasable-Programmable Read Only Memory 156, yet the media management application 14 could alternatively or additionally reside in the Read Only Memory 152 and/or the Random Access/Flash Memory 154. An Input/Output module 158 handles communication between the Subscriber Identity Module 140 and the media device. As those skilled in the art will appreciate, there are many suitable ways for implementing the operation and physical/memory structure of the Subscriber Identity Module. If, however, the reader desires more information on the Subscriber Identity Module, the reader is directed to the following sources: LAWRENCE HARTE et al., GSM SUPERPHONES 99-100, 113-14 (1999); SIEGMUND REDL et al., GSM AND PERSONAL COMMUNICATIONS HANDBOOK 303-69 (1998); and JOACHIM TISAL, GSM CELLULAR RADIO TELEPHONY 99-130 (1997), with each incorporated herein by reference.

Figure 15:
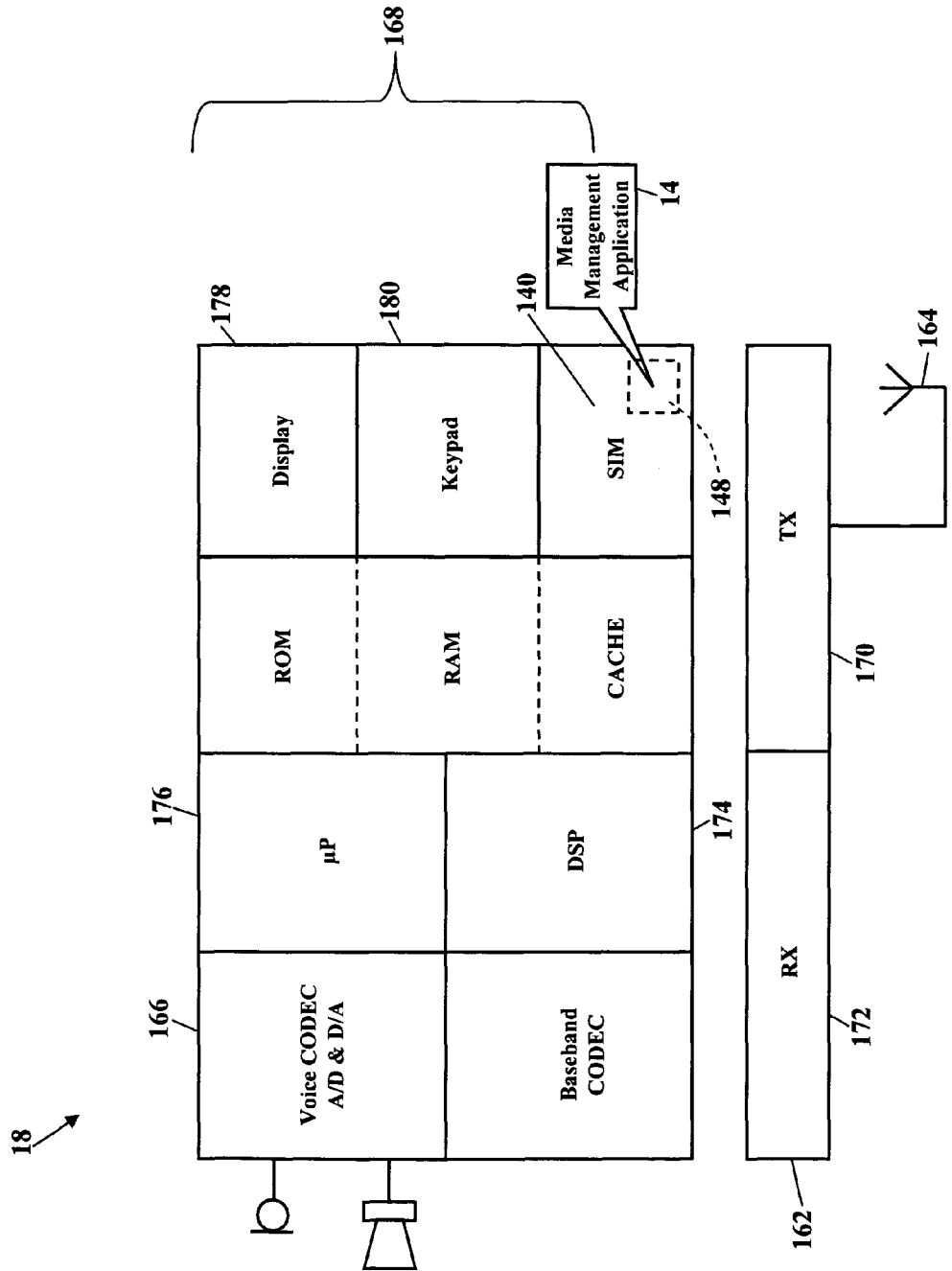
FIG. 15 is a schematic further illustrating various additional media devices for accessing files, according to more exemplary embodiments.

FIG. 15 is a schematic further illustrating various additional media devices for accessing files, according to more exemplary embodiments. FIG. 15 is a block diagram of another media device 18 utilizing the media management application 14. Here the media device 18 comprises a radio transceiver unit 162, an antenna 164, a digital baseband chipset 166, and a man/machine interface (MMI) 168. The transceiver unit 162 includes transmitter circuitry 170 and receiver circuitry 172 for receiving and transmitting signals. The transceiver unit 162 couples to the antenna 164 for converting electrical current to and from electromagnetic waves. The digital baseband chipset 166 contains a digital signal processor (DSP) 174 and performs signal processing functions for audio (voice) signals and RF signals. As FIG. 15 shows, the digital baseband chipset 166 may also include an on-board microprocessor 176 that interacts with the man/machine interface (MMI) 168. The man/machine interface (MMI) 168 may comprise a display device 178, a keypad 180, and the Subscriber Identity Module 140. The on-board microprocessor 176 performs GSM protocol functions and control functions for the radio circuitry 170 and 172, for the display device 178, and for the keypad 180. The on-board microprocessor 176 may also interface with the Subscriber Identity Module 140 and with the media management application 14 residing in the memory module 148 of the Subscriber Identity Module 140. Those skilled in the art will appreciate that there may be many suitable architectural configurations for the elements of the media device 18. If the reader desires a more detailed explanation, the reader is invited to consult the following sources: LAWRENCE HARTE et al., GSM SUPERPHONES 105-120 (1999); SIEGMUND REDL et al., GSM AND PERSONAL COMMUNICATIONS HANDBOOK 389-474 (1998); and JOACHIM TISAL, GSM CELLULAR RADIO TELEPHONY 99-130 (1997), with each incorporated herein by reference.

The media management application 14 may be utilized regardless of signaling standard. As those of ordinary skill in the art recognize, FIGS. 12-15 illustrate a Global System for Mobile (GSM) media device. That is, the media device 18 utilizes the Global System for Mobile (GSM) communications signaling standard. Those of ordinary skill in the art, however, also recognize the exemplary embodiments are equally applicable to any media device utilizing the Time Division Multiple Access signaling standard, the Code Division Multiple Access signaling standard, the "dual-mode" GSM-ANSI Interoperability Team (GAIT) signaling standard, or any variant of the GSM/CDMA/TDMA signaling standard.

Figure 16:
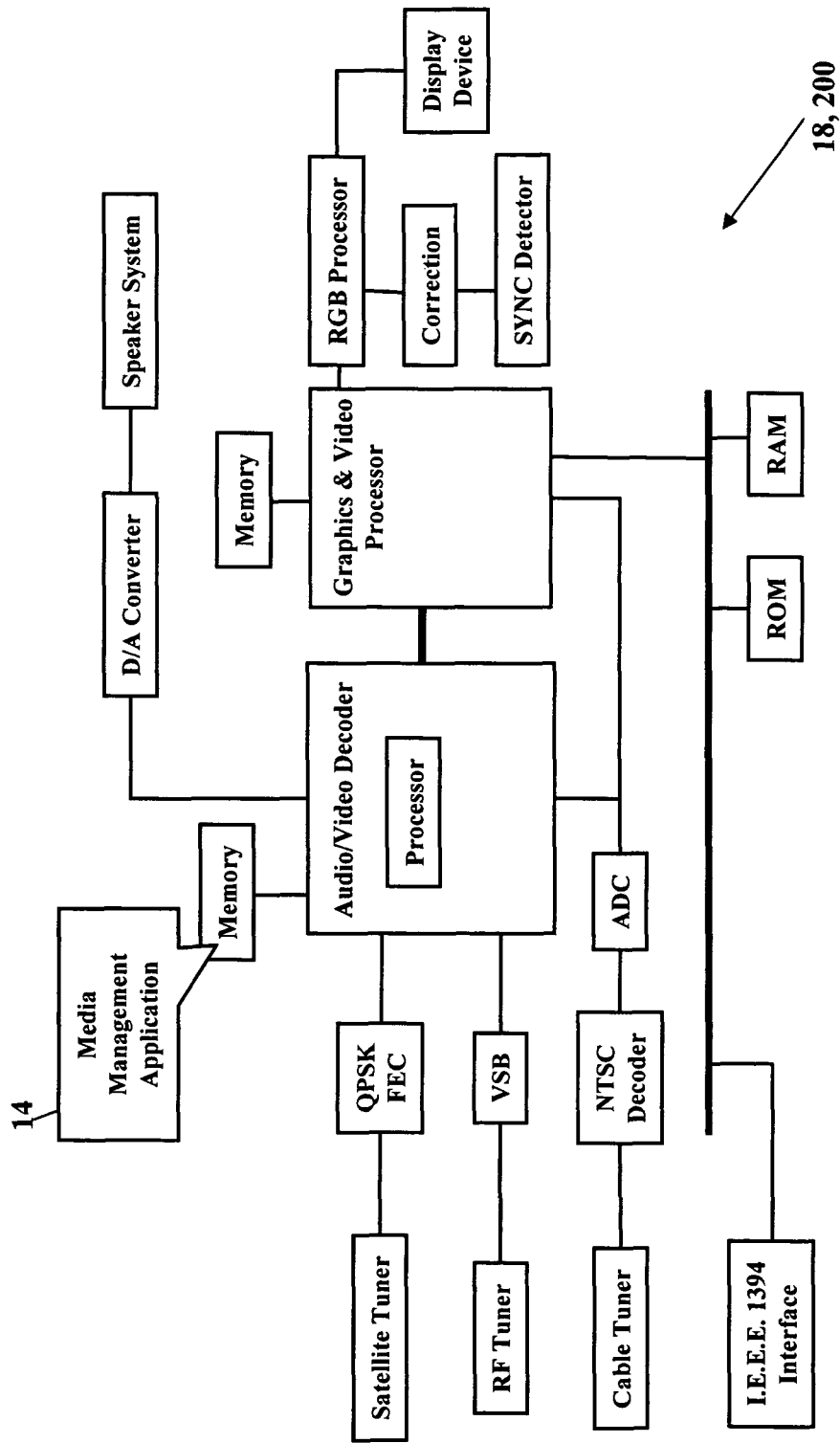
FIG. 16 is a block diagram further illustrating another media device incorporating the exemplary embodiments.

FIG. 16 is a block diagram further illustrating the media device 18, according to yet more of the exemplary embodiments. Here the media device 18 is shown as a digital high definition television (HDTV) system 200. The television 200 stores the media management application 14 in any memory location. Although an HDTV system is shown, the exemplary embodiments are applicable to any television design. The concepts, for example, are applicable to analog circuitry, digital circuitry, analog signals, and/or or digital signals. The television may include an encoder/decoder, such as an embedded set-top box. The term "television," however, may encompass a stand-alone set-top box that is a separate component from the television. The television may also utilize any display device technology, such as a cathode-ray, a liquid crystal, a diode, digital micromirror, light processor, or plasma. The media management application 14 may be stored in any memory location or device in the television 200. FIG. 16, though, is only a simplified block diagram. The operating and engineering principles are already known in the art and will not be repeated here. If, however, the reader desires more information on the television, the reader is directed to the following sources: MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, iTV HANDBOOK: TECHNOLOGIES AND STANDARDS (2004), with each incorporated herein by reference.

FIG. 17 is a flowchart illustrating a processor-implemented method of accessing stored files, according to an exemplary embodiment. A hierarchically-arranged storage system storing files is accessed (Block 300). A graphical user interface is processed, with the graphical user interface having a single control that provides access to both the hierarchical arrangement and to any file within the hierarchical arrangement (Block 302). A cursor position is mapped to an index of the files, such that the cursor position determines which file is processed for display in the single control (Block 304). That file is processed for display in the single control (Block 306). The single control causes a single window to concurrently display a selected file and its corresponding physical storage location (Block 308). A caption may be processed for display in the single control, the caption corresponding to a file (Block 310). A granularity property is processed that enforces a maximum number of images that may be displayed in the single control (Block 312). A single input may be processed to select any file residing at any level within the hierarchically-arranged storage system (Block 314).

The media management application (shown as reference numeral 14 in FIGS. 1-16) may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the exemplary embodiments, allow the media management application to be easily disseminated. A computer program product comprises the media management application stored on the computer-readable medium. The media management application comprises computer-readable instructions/code for accessing files, as hereinabove explained. The media management application may also be physically embodied on or in any addressable (e.g., HTTP, I.E.E.E. 802.11, Wireless Application Protocol (WAP), or BLUETOOTH®) wireless device capable of presenting an IP address.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

What is claimed is:

1. A processor-implemented method of accessing stored images, comprising:

accessing a hierarchically-arranged album storing a plurality of sub-albums, the sub-albums being represented by a user interface element;

providing a graphical user interface having a single control, where the single control:

displays the hierarchical arrangement;

provides access to any image within a sub-album of the plurality of sub-albums of the hierarchical arrangement; and provides a scalability feature that enforces a maximum number of images that may be displayed where the scalability feature includes scroll controls that allow for scrolling through the plurality of sub-albums and images within the plurality of sub-albums;

receiving a single input corresponding to a position within the single control, the position within the single control automatically selecting an image within the sub-album of the plurality of sub-albums stored within the hierarchical arrangement, wherein the scalability feature stretches sub-albums of the plurality of sub-albums stored within the hierarchical arrangement thereby increasing a pixel length between each of the sub-albums of the plurality of sub-albums;

processing a caption for display in the single control, the caption indicating a name of the hierarchically-arranged album, a path of the image, and an annotation of the image within the hierarchically-arranged album; and displaying the image within the hierarchical arrangement, wherein the single input within the single control simultaneously provides navigation of the hierarchical arrangement, selection of the image within the hierarchical arrangement, and display of the image within the hierarchical arrangement.

2. A method according to claim 1, further comprising mapping a cursor position to an index of images within the hierarchically-arranged album, such that the cursor position determines which image is processed for display in the single control.

3. A method according to claim 1, further comprising processing the image for display in the single control.

4. A method according to claim 1, wherein the single control causes a single window to visually present the hierarchical arrangement and the sub-albums, such that the single window concurrently displays a selected image and its corresponding physical storage location.

5. A method according to claim 1, further comprising processing a single input within a single window to select any image residing at any level within the hierarchically-arranged album.

6. A method according to claim 1, wherein the user interface element is a tab.

7. A system, comprising:
a media management application stored in memory; and
a processor communicating with the memory,
the processor accessing a hierarchically-arranged album storing a plurality of sub-albums, the sub-albums being represented by a user interface element; and
the processor providing a graphical user interface having a single control, where the single control:
displays the hierarchical arrangement;
provides access to any image within a sub-album of the plurality of sub-albums of the hierarchical arrangement;
provides a scalability feature that enforces a maximum number of images that may be displayed where the scalability feature includes scroll controls that allow for scrolling through the plurality of sub-albums and images within the plurality of sub-albums;
receives a single input corresponding to a position within the single control, the position within the single control automatically selecting an image within the sub-album of the plurality of sub-albums stored within the hierarchical arrangement, wherein the scalability feature stretches sub-albums of the plurality of sub-albums stored within the hierarchical arrangement thereby increasing a pixel length between each of the sub-albums of the plurality of sub-albums;
processes a caption for display in the single control, the caption indicating a name of the hierarchically-arranged album, a path of the image, and an annotation of the image within the hierarchically-arranged album; and
displays the image within the hierarchical arrangement, wherein the single input within the single control simultaneously provides navigation of the hierarchical arrangement, selection of the image within the hierarchical arrangement, and display of the image within the hierarchical arrangement.

8. A system according to claim 7, wherein the processor further maps a cursor position to an index of images within the hierarchically-arranged album, such that the cursor position determines which image is processed for display.

9. A system according to claim 7, wherein the processor processes the image for display in the single control.

10. A system according to claim 7, wherein the single control causes a single window to visually present the hierarchical arrangement and the plurality of sub-albums, such that the single window concurrently displays a selected image and its corresponding multi-level storage location.

11. A system according to claim 7, wherein the processor processes a single input within a single window to select any image residing at any level within the hierarchically-arranged album.

12. A non-transitory computer-readable storage medium storing instructions for performing the steps:
accessing a hierarchically-arranged album storing sub-albums, the sub-albums being represented by a user interface element;
providing a graphical user interface having a single control, where the single control:
displays the hierarchical arrangement;
provides access to any image within a sub-album of the plurality of sub-albums of the hierarchical arrangement;
provides a scalability feature that enforces a maximum number of images that may be displayed where the scalability feature includes scroll controls that allow for scrolling through the plurality of sub-albums and images within the plurality of sub-albums;
receives a single input corresponding to a position within the single control, the position within the single control automatically selecting an image within the sub-album of the plurality of sub-albums stored within the hierarchical arrangement, wherein the scalability feature stretches sub-albums of the plurality of sub-albums stored within the hierarchical arrangement thereby increasing a pixel length between each of the sub-albums of the plurality of sub-albums;
processes a caption for display in the single control, the caption indicating a name of the hierarchically-arranged album, a path of the image, and an annotation of the image within the hierarchically-arranged album; and
displays the image within the hierarchical arrangement, wherein the single input within the single control simultaneously provides navigation of the hierarchical arrangement, selection of the image within the hierarchical arrangement, and display of the image within the hierarchical arrangement.

13. A non-transitory computer-readable storage medium according to claim 12, further comprising instructions for mapping a cursor position to an index of images within the hierarchical arrangement, such that the cursor position determines which image is processed for display in the single control.

14. A non-transitory computer-readable storage medium according to claim 12, further comprising instructions for processing the image for display in the single control.

15. A non-transitory computer-readable storage medium according to claim 12, further comprising instructions for processing a granularity property for the single control, the granularity property enforcing a maximum number of images that may be displayed in the single control.

16. A non-transitory computer-readable storage medium according to claim 12, further comprising instructions for:
   i) causing a single window to visually present the hierarchical arrangement and the plurality of sub-albums, and
   ii) processing a single input within the single window to select any image residing at any level within the hierarchically-arranged album such that the single window concurrently displays the selected image and its corresponding physical storage location.

* * * * *